| United States Patent [19] | [11] | 4,197,383 |
|---|---|---|
| Shell | [45] | Apr. 8, 1980 |

[54] CUT GROWTH RESISTANT RUBBERS

[75] Inventor: Robert L. Shell, Akron, Ohio

[73] Assignee: The Goodyear Tire & Rubber Company, Akron, Ohio

[21] Appl. No.: 588,256

[22] Filed: Jun. 19, 1975

[51] Int. Cl.² .................. C08L 71/02; C08L 9/00; C08L 23/16; C08L 19/00
[52] U.S. Cl. .................................. 525/405; 525/141
[58] Field of Search .......................... 260/845, 838

[56] References Cited

U.S. PATENT DOCUMENTS

| 3,638,702 | 2/1972 | Endter | 260/845 |
| 3,676,529 | 7/1972 | Fall | 260/887 |
| 3,738,948 | 6/1973 | Dunnom | 260/845 |
| 3,746,669 | 7/1973 | Dunnom et al. | 260/845 |
| 3,821,133 | 6/1974 | Doran et al. | 260/845 |

*Primary Examiner*—Carman J. Seccuro
*Attorney, Agent, or Firm*—J. D. Wolfe

[57] ABSTRACT

A method of providing a cured low unsaturated elastomer polymer of improved crack growth resistance under high flex conditions. Specifically, oxypropylene rubbers are compounded with small amounts of hexamethylene tetramine and polyhydroxyl aromatic compounds having less than 500 molecular weight.

3 Claims, No Drawings

CUT GROWTH RESISTANT RUBBERS

This invention relates to a method of curing low unsaturation elastomers or polymers to obtain cured compositions having improved cut growth resistance. More particularly, this invention relates to a method of curing oxypropylene rubber to obtain a cured elastomer having improved resistance to crack growth under high flex conditions.

Low unsaturated elastomers or polymers such as EPDM, butyl rubber or oxypropylene rubber have poor resistance to crack growth and especially is this so under high flex conditions. Therefore, elastomers of this type are not entirely satisfactory in hose, skirts for hovercraft, air springs and related uses.

It has been discovered that the low unsaturated elastomers or polymers can be cured with a sulfur cure system containing hexamethylene tetramine and an aromatic polyol having a molecular weight of less than 500 and preferably 100 to 350 to obtain a cured elastomer having improved resistance to cut growth. The improvement of this method can be obtained by compounding the low unsaturated elastomer or polymer with sulfur and related sulfur accelerators together with at least 0.1 part per hundred of rubber of hexamethylene tetramine and at least 0.1 part per hundred of rubber of the polyhydroxyl aromatic compound and then curing the same. As the amount of the hexamethylene tetramine increases and the aromatic polyhydroxyl compound increases up to about 5 parts per hundred of each there is an improvement in the cut growth resistance with the optimum amounts being from 0.5 to 2.5 parts of hexamethylene tetramine and 2.5 to 4.5 parts of aromatic polyhydroxyl compound. As the amount of each of these additives exceeds about 5 parts per hundred, the improvement in cut growth resistance becomes a matter of economic and performance requirements rather than a limiting factor on the maximum amount of these additives that may be utilized.

The upper limit on the hexamethylene tetramine (sometimes called Hexa) to aromatic polyol ratio is 4 to 1 and ratios as low as 1 to 9 can be used. It should be appreciated that an excess of hexamethylene tetramine will bloom in the cured polymer and for this reason generally is not as desirable as ranges of hexamethylene tetramine to aromatic polyol ratios of 1 to 1 down to 1 to 9.

The compounding ingredients can be added in any of the usual ways, for example, on the mill or Banbury with the preferred addition being to add the hexatetramethylene tetramine and resorcinol on the mill.

Of the aromatic polyhydroxyl compound having a molecular weight less than 500, those having the hydroxyl groups in the ortho position to one another are preferred and tend to give the best cut growth resistance. Representative of the aromatic polyhydroxyl compounds are resorcinol, catechol, phloroglucinol, pyrogallol, orthoortho'-bisphenol, trimethyl hydroquinone, 2,7-dihydroxy toluene, alizarin, 1,8-dihydroxy antraquinone, 4,4'-dihydroxy benzophenone and the alkoxy esters of these polyhydroxyl compounds where the alkoxy is methyl, ethyl, propyl and related alkoxy radicals containing from 1 to 12 carbon atoms.

The nature of this invention may be more readily understood by reference to the following examples wherein the parts and percentages are by weight unless otherwise indicated.

EXAMPLE I

An oxypropylene rubber was compounded on a mill with SRF black and the compounding agents shown in Table 1. Then this rubber was cured at 155° C. for 20 minutes and the vulcanizates were tested. The results of the tests on the various formulations of oxypropylene rubber are shown in Table 1.

Table 1

| Formulation | Use of Hexa and Resorcinol in OPR for Cut Growth Improvement | | | | | | | |
|---|---|---|---|---|---|---|---|---|
| | 1 | 2 | 3 | 4 | 5 | 6 | 7 | 8 |
| Oxypropylene Rubber* | 100 | → | → | → | → | → | → | → |
| SRF Carbon black | 35 | → | → | → | 20 | → | → | → |
| HiSil 233 | | | | | 20 | → | → | → |
| Nickel dibutyl dithio carbamate | 1 | → | → | → | → | → | → | → |
| ZnO | 3 | → | → | → | → | → | → | → |
| Stearic Acid | 2 | → | → | → | → | → | → | → |
| Tetramethyl thiuram disulfide | 0.9 | → | → | → | → | → | → | → |
| Mercaptobenzothiazole disulfide | 0.75 | → | → | → | → | → | → | → |
| Sulfur | 1.1 | | | | | | | |
| Hexamethylene tetramine | — | 2.2 | — | 2.2 | — | 2.2 | — | 2.2 |
| Resorcinol | — | — | 3.4 | 3.4 | — | — | 3.4 | 3.4 |
| TOTAL | 143.75 | 145.95 | 147.15 | 149.35 | 148.75 | 150.95 | 152.15 | 154.35 |
| Physical Properties | | | | | | | | |
| 100% Modulus (psi) | 165 | 165 | 150 | 150 | 210 | 180 | 175 | 205 |
| 300% Modulus (psi) | 600 | 545 | 500 | 535 | 615 | 490 | 505 | 680 |
| Tensile (psi) | 2060 | 2375 | 2430 | 1840 | 2450 | 2400 | 2545 | 1835 |
| Elongation (%) | 730 | 870 | 850 | 655 | 810 | 940 | 910 | 670 |
| Shore A hardness | 47 | 47 | 46 | 47 | 54 | 51 | 51 | 52 |
| Crescent Tear (lb/in) | 204 | 203 | 199 | 180 | 210 | 215 | 208 | 204 |
| Pierced Groove Flex (Flexes to ¼" cut) × $10^3$ | 40 | 40 | 70 | 5000** | 80 | 140 | 130 | 1800 |

*Oxypropylene rubbers can be prepared according to the teachings of U.S. Pat. No. 3,676,529.
**Test stopped when the cut reached one-fourth inch.

EXAMPLE II

An oxypropylene rubber was compounded on a mill with amounts of Hexa and polyhydroxyl benzenes shown in Table 2 to test the effect of various polyhydroxyl benzene compounds on cut tear properties of the cured oxypropylene rubber. Each formulation contained 100 parts of oxypropylene rubber (OPR), 35 parts SRF black, 3.0 parts zinc oxide, 2.0 parts stearic acid, 1.0 parts nickel dibutyldithiocarbamate, 0.9 parts tetramethylthiuram disulfide (TmTD), 0.75 parts mercaptobenzothiazole disulfide (MBTS) and 1.1 parts sulfur in addition to Hexa and polyhydroxylbenzenes shown in Table 2.

Each sample was cured for 20 minutes at 155° C. before being tested as shown in the table.

Table 2

| Effect of Resorcinol Substitutes on Pierced Groove Flex | | | | | | |
|---|---|---|---|---|---|---|
| Sample No.* | 9 | 10 | 11 | 12 | 13 | 14 |
| Hexa | 2.0 | → | → | → | → | → |
| Resorcinol | 2.0 | | | | | |
| Hydroquinone | | 2.0 | | | | |
| Catechol | | | 2.0 | | | |
| Phloroglucinol | | | | 2.0 | | |
| Pyrogallol | | | | | 2.0 | |
| Monsanto Rheometer-310° F. | | | | | | |

Table 2-continued

| Effect of Resorcinol Substitutes on Pierced Groove Flex | | | | | | |
|---|---|---|---|---|---|---|
| Sample No.* | 9 | 10 | 11 | 12 | 13 | 14 |
| 5,500,00 flexes | .15 | .13 | .12 | .12 | .10 | .64** |

*Each formulation contains: OPR 100.0 SRF Black 35, Zinc Oxide 3.0, Stearic Acid 2.0, Nickel dibutyldithiocarbamate 1.0, TMTD 0.9, MBTS 0.75, Sulfur 1.1.
**After one million flexes on the DeMattin Flex test machine using ASTM test D-813.

In Table 3 other polyhydroxyl aromatic compounds are shown compounded in the same manner as in Example II and with the amount of Hexa shown. These samples were cured for 30 minutes at 160° C. and physical test results on these cured samples are as shown.

Table 3

| Effect of Other Resorcinol Substitutes on Pierced Groove Flex | | | | | | | | | | |
|---|---|---|---|---|---|---|---|---|---|---|
| Sample No. | 15 | 16 | 17 | 18 | 19 | 20 | 21 | 23 | 24 | 25 |
| Formulation | 0 | 1.0 | 0 | 1.0 | 1.0 | 1.0 | 1.0 | 1.0 | 1.0 | 1.0 |
| Polyhydroxyl compound | | Resorcinol | | Resorcinol | 0,0'-Bisphenol | Trimethylhydroquinone | 2,7-dihydroxytoluene | Ali-1, aza-xyrin | 8-dihydroxyantraquinone | 4,4'-dihydroxy benzophenone |
| Amount | 0 | 3.0 | 3.0 | 3.0 | 3.0 | 3.0 | 3.0 | 3.0 | 3.0 | 3.0 |
| Monsanto Rheometer--320° F. | | | | | | | | | | |
| Max. | 42 | 39 | 39 | 39 | 38 | 34 | 37 | 30 | 37 | 38 |
| Torque | 30 | 27 | 28 | 27 | 28 | 22 | 27 | 19 | 26 | 28 |
| Time to 90% Cure | 18 | 23 | 16 | 17 | 27 | 15 | 30 | 50 | 27 | 28 |
| Time to 2 Pt.Rise | 5.5 | 4.8 | 4.8 | 3.6 | 4.4 | 2.2 | 4.2 | 7.5 | 5.6 | 5.0 |
| Physicals | | | | | | | | | | |
| 100% Modulus (psi) | 150 | 155 | 150 | 170 | 155 | 130 | 150 | 160 | 155 | 145 |
| 300% Modulus (psi) | 545 | 580 | 545 | 665 | 505 | 460 | 550 | 440 | 570 | 505 |
| Tensile (psi) | 2020 | 2195 | 2075 | 1850 | 2280 | 1800 | 2240 | 2370 | 1965 | 2400 |
| Elongation (%) | 760 | 790 | 795 | 575 | 875 | 790 | 810 | 960 | 745 | 885 |
| Shore A Hardness | 46 | 46 | 44 | 52 | 47 | 42 | 49 | 45 | 45 | 48 |
| Pierced Groove Flex | | | | | | | | | | |
| Initial hole - .08" Crack after 200,000 Flexes (inches) | .81 | .50 | .56 | .19 | .35 | .23 | .13 | .13 | .42 | .33 |

*Same formulation as Table 2.

| | | | | | | |
|---|---|---|---|---|---|---|
| Max | 26 | 24 | 19 | 26 | 19 | 31 |
| ΔTorque | 17 | 15 | 10 | 17 | 10 | 23 |
| Time to 90% cure | 26 | 22.5 | 28 | 25 | 30 | 25 |
| Time to 2 pt rise | 5.3 | 4.1 | 6.2 | 3.8 | 6.0 | 13.0 |
| Physicals | | | | | | |
| 100% Modulus (psi) | 150 | 115 | 95 | 145 | 100 | 140 |
| 300% Modulus (psi) | 545 | 365 | 270 | 540 | 255 | 470 |
| Tensile (psi) | 1950 | 2440 | 1655 | 1620 | 1410 | 2560 |
| Elongation (%) | 695 | 1075 | 1030 | 660 | 1055 | 980 |
| Shore A hardness | 50 | 45 | 44 | 50 | 45 | 47 |
| Pierced Groove Flex | | | | | | |
| Initial hole = .08" Crack size after | | | | | | |

By the term "sulfur accelerator" is meant those accelerators such as TMTD, MBTS and metal salts of dialkyldithio carbamate used in conjunction with sulfur to affect the speed of cure. The cure temperature and the time of cure are those normally used with sulfur to cure oxypropylene rubber.

While certain representative embodiments and details have been shown for the purpose of illustrating the invention, it will be apparent to those skilled in this art that various changes and modifications may be made therein without departing from the spirit or scope of the invention.

What is claimed is:

1. A cured oxypropylene rubber having improved cut growth resistance obtained by curing a compounded unsaturated oxypropylene rubber containing a sulfur curative and 0.1 to 5.0 parts of hexamethylene tetramine and 0.1 to 5.0 parts of a polyhydroxyl aromatic compound having a molecular weight less than 500.

2. The cured rubber of claim 1 wherein the polyhydroxyl aromatic compound has a molecular weight of 100 to 350.

3. The cured rubber of claim 1 wherein the polyhydroxyl aromatic compound is resorcinol.

* * * * *